(12) United States Patent
Sudo et al.

(10) Patent No.: US 6,218,861 B1
(45) Date of Patent: Apr. 17, 2001

(54) FUNCTIONAL BLOCK AND SEMICONDUCTOR INTEGRATED CIRCUIT ARCHITECTED BY A PLURALITY OF FUNCTIONAL BLOCKS IN COMBINATION

(75) Inventors: Fumio Sudo; Takao Shijo, both of Kanagawa-ken; Hiroki Muroga, Saitama-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/111,703

(22) Filed: Jul. 8, 1998

(30) Foreign Application Priority Data

Jul. 8, 1997 (JP) .................................................... 9-182705

(51) Int. Cl.⁷ ...................................................... G06F 7/38
(52) U.S. Cl. .................................. 326/46; 326/40; 326/37
(58) Field of Search .................................. 326/21, 37, 39, 326/40, 46, 93; 327/141, 144, 145, 155

(56) References Cited

U.S. PATENT DOCUMENTS 5,162,667 * 11/1992 Jasui et al. ......................... 307/272.2
5,259,006 * 11/1993 Price et al. ............................ 375/107
5,815,726 *  9/1998 Cliff .................................. 395/800.01

* cited by examiner

Primary Examiner—Michael Tokar
Assistant Examiner—Anh Tran
(74) Attorney, Agent, or Firm—Foley & Lardner

(57) ABSTRACT

There is disclosed a functional block which comprises a function portion, a plurality of block input terminals, a plurality of block output terminals, a first signal holding circuit group connected between inputs of the function portion and the plurality of block input terminals, and a second signal holding circuit group connected between outputs of the function portion and the plurality of block output terminals. Since the first signal holding circuits and the second signal holding circuits receive a clock signal supplied externally to the functional block and then operate to synchronize with the clock signal respectively, a delay time of output signals for input signals in the functional block can be easily estimated. Hence, simulation of a semiconductor integrated circuit constructed by combining a plurality of functional blocks can be easily performed.

16 Claims, 7 Drawing Sheets

US 6,218,861 B1

FUNCTIONAL BLOCK AND SEMICONDUCTOR INTEGRATED CIRCUIT ARCHITECTED BY A PLURALITY OF FUNCTIONAL BLOCKS IN COMBINATION

BACKGROUND OF THE INVENTION

1. Field of the Invention

The present invention relates to a functional block and a semiconductor integrated circuit into which a plurality of functional blocks are incorporated in combination and, more particularly, an LSI design technology using functional blocks whose delay analysis can be facilitated.

2. Description of the Related Art

In the prior art, normally system designers have architected a desired system by arranging a plurality LSI chips on a printed wiring board and then providing wiring between them. The LSI manufacturers have fabricated LSI chips for respective functions such as CPU, memory, peripheral circuit, etc.

In recent years, with the progress of miniaturization and higher density of LSI, several millions of transistors have been incorporated on one chip. Therefore, a plurality of functions have been able to be mounted on one chip. That is, the change from silicon-on-system to system-on-silicon has been brought about. In order to answer to such change to the system-on-silicon, the LSI manufacturers have kept a large number of functional blocks which are constructed in each functional unit such as CPU, peripheral circuit, etc. and also enhanced the functional blocks as a library. Such library has been assembled by preparing circuit information and layout information concerning the kept functional blocks as the database. The LSI manufacturers have implemented the LSI by using various functional blocks which are prepared in the library in combination. By employing the above library, the LSI manufacturers can take quick responses to new LSI development requests issued from the system designers respectively.

A functional block in the prior art will be explained with reference to FIG. 1 hereinafter. FIG. 1 shows an example of a configuration of the functional block in the prior art. A functional block 1 comprises a function portion 2, a plurality of input terminals 3-1, 3-2, 3-3, . . . , 3-m (where m is a natural number) connected to the function portion 2, a plurality of output terminals 4-1, 4-2, 4-3, . . . , 4-n (where n is a natural number), a clock input terminal 5 for receiving a clock signal CLK, and a reset input terminal 6 for receiving a reset signal RST. The function portion 2 can perform predetermined operations of a plurality of input signals IN1, IN2, IN3, . . . , INm supplied from the input terminals 3-1, 3-2, . . . , 3-m, and then output results of the operations from the output terminals 4-1, 4-2, 4-3, . . . , 4-n as output signals OUT1, OUT2, OUT3, . . . , OUTn. The clock signal CLK and the reset signal RST are supplied to the function portion 2. The clock signal CLK is a signal used as reference in carrying out a synchronous operation. The functional block 1 can perform the synchronous operation on a basis of the clock signal CLK. Regardless of its present state, the functional block 1 can be brought into its reset state by the reset signal RST.

The function portion 2 has a plurality of logic portions 7-1, 7-2, 7-3, . . . , 7-k (where k is a natural number). The logic portions 7-1, . . . , 7-k can receive at least one of plural input signals IN1, IN2, . . . , INm and generate the output signals OUT1, OUT2, . . . , OUTn respectively. In some cases, the function portion 2 has synchronizing circuits such as flip-flops, though not illustrated.

Further, the flip-flops serving as the synchronizing circuits are arranged at need on the input side and the output side of the function portion 2. For example, in FIG. 1, a flip-flop 8 is arranged on the input side of the function portion 2 while a flip-flop 9 is arranged on the output side of the function portion 2. In other words, the flip-flop 8 is connected between an input terminal 3-1 and a logic portion 7-1 while the flip-flop 9 is connected between a logic portion 7-2 and an output terminal 4-2. A clock signal CLK input from the clock input terminal 5 is supplied to both clock terminals CK of the flip-flop 8 and the flip-flop 9 via a buffer 10. The flip-flop 8 can receive the input signal IN1 and then output the input signal IN1 to the logic portion 7-1 in synchronous with the clock signal CLK. The flip-flop 9 can receive the output signal of the logic portion 7-2 and then output it to the output terminal 4-2 as the output signal OUT2 in synchronous with the clock signal CLK. In addition, the reset signal RST is input into the reset terminals R of both flip-flops via a buffer 11. Both the flip-flops 8, 9 can be brought into their reset states by the reset signal RST irrespective of their present states.

In this way, in the functional block in the prior art, the function portion 2 can generate the output signals OUT1, OUT2, OUT3, . . . , OUTn in response to the input signals IN1, IN2, IN3, . . . , INm being input from the input terminals 3-1, 3-2, 3-3, . . . , 3-m, and then output such output signals OUT1, OUT2, OUT3, . . . , OUTn to the output terminals 4-1, 4-2, 4-3, . . . , 4-n via buffers 12-1, 12-2, 12-3, . . . , 12-n respectively.

In order to manufacture the products in accordance with specifications, it is common for the LSI manufacturer to execute the function, timing and other design verifications by virtue of simulation with using a computer system before manufacture and then start actual manufacturing steps after the verifications has been completed. The verifications can be conducted based on a functional model which can be architected by combining the functional blocks together. Timing specifications for respective functional blocks have been very important in the verifications. However, in recent years, circuit configurations of respective functional blocks have become more complicated according to increases in the scale and the operational speed of the LSI, so that it has not been easy to precisely define the delay time of the output signals for the input signals of the functional blocks. As a result, the verifications based on the above simulation has become difficult.

For example, an AND-OR circuit composed of a two-input AND gate and a two-input OR gate will be explained. In this AND-OR circuit, an output of the AND gate and one input A of the OR gate are connected. Only if the output of the AND gate is 0, an output change of the OR gate depends on other input B change of the OR gate. The output of the AND gate is 0 only when a combination of the inputs of the AND gate is (0,0), (0,1), (1,0). In this OR gate, there are certain differences in delay time of the output for the input B according to the inputs of the AND gate.

Like this, the delay time of one output for one input depends on the state of others. Nevertheless, shown in FIG. 1, the functional block in which a number of such logic circuits has a large number of input signals. Therefore, it is very difficult in practice to define clearly the delay time. One of causes is that a plurality of signal transmission lines are present from one input to one output. The second cause is that it cannot be decided from the state of the inputs which line has been taken. The third cause is that it is decided from the output signal change which input signal has changed.

Meanwhile, the flip-flop 8 is provided between the input terminal 3-1 and the logic portion 7-1. The input signal IN1 is fetched into the flip-flop 8 once. The flip-flop 8 outputs the input signal IN1 to the logic portion 7-1 in synchronous with the clock signal CLK. However, it is still difficult to define the delay time caused from an output Q of the flip-flop 8 to the output terminal 4-1. Then, the flip-flop 9 is connected on the output side of the logic portion 7-2. Hence, the logic portion 7-2 can output the output signal OUT2 to the output terminal 4-2 in synchronous with the clock signal CLK. However, there exists no synchronizing circuit on the input side. Thus, it is difficult to define the delay time caused from the input terminal 3-2 to an input of the logic portion 7-2.

Furthermore, in the logic portions 7-1, . . . , 7-k in FIG. 1, it is also possible to say the same thing as above. FIG. 2 shows an example of one configuration of the logic portions 7-1, . . . , 7-k shown in FIG. 1. The logic portion 13 in FIG. 2 has a plurality of random logics 14-1, 14-2, 14-3, . . . , 14-l (where l is a natural number), and a selector 15 for selecting one of the outputs from the plurality of random logics 14-1, 14-2, 14-3, . . . , 14-l based on a select signal SELECT and outputting it. Inputs of the logic portion 13 are connected to a flip-flop 16, a flip-flop 17, and a flip-flop 18 provided on the outside of the functional block. Then, an output of the logic portion 13 is connected to a flip-flop 19 provided in the functional block. A plurality of signal transmission lines are present from the flip-flop 16, the flip-flop 17, and the flip-flop 18 to the flip-flop 19 in the logic portion 13. The delay time which is required for the signal to come up to the flip-flop 19 is different based on which route such signal has taken. As a consequence, it is not easy to define the delay time.

FIG. 3 shows another example of one configuration of the logic portions 7-1, 7-2, . . . , 7-k shown in FIG. 1. A logic portion 20 in FIG. 3 has a plurality of random logics 21-1, 21-2, . . . , 21-l, and a selector 22 for selecting one of the outputs from the plurality of random logics 21-1, 21-2, . . . , 21-l based on the select signal SELECT and outputting it. Inputs of the logic portion 20 are connected to a flip-flop 23, and a flip-flop 24 connected in the inside of the functional block. Then, an output of the logic portion 20 is connected to a flip-flop 25 on the outside of the functional block. A plurality of signal transmission lines exist from the flip-flop 23, and the flip-flop 24 to the flip-flop 25 in the logic portion 20. Normally, in synchronous design, the delay time in the output of the functional block is defined by using the clock signal as a reference. However, since there exist a plurality of routes in the above logic portion 20, actually the delay times are different on respective routes. Hence, definition of the precise delay time is not easy. Also, even if the delay times on respective routes can be defined precisely, it is still difficult to define precisely the delay time in the logic portion 20. This is because, in case the select signal SELECT is controlled according to an internal state of the logic portion 20, it cannot be decided from the outside of the logic portion 20 which route has been taken by the output signal.

An ASIC such as gate array, standard array, etc. is architected by installing a combination of a plurality of functional blocks. For example, the case will be discussed where an output of one functional block (called a "functional block A" herein) is input into the other functional block (called a "functional block B" herein). The delay time caused in the functional block A becomes different according to an input state of the functional block A. Therefore, there is such a possibility that an output of the functional block A is provided against a timing constraint on an input of the functional block B to thus cause a failure of the functional block B. In addition, with the miniaturization and the higher operational speed of the LSI, the signal delay which is caused by wiring connecting the output of the functional block A to the input of the functional block B has been increased to such an extent that it cannot be ignored. Therefore, there is a possibility that, even if an operation of the functional block as a single body can be assured, an operation of the integrated circuit in which a plurality of functional blocks are incorporated in combination cannot be ensured yet. Especially, in the event that the synchronizing circuits such as flip-flops, etc. are employed, their operations cannot be ensured unless a specified setup time or hold time can be taken.

In view of the above respects, it is indispensable before start of the production to perform the behavior confirmation by using simulation. However, in the existing circumstance that the precise definition of the delay time has not been made easy, as stated above, such simulation has become very difficult.

Moreover, even if the definition of the delay time has been given and also the failure in operation has been confirmed by virtue of simulation, correction of the functional blocks cannot be performed in practice. This is because such correction of the functional blocks takes the same cost and time as the case where the functional blocks are newly developed and such correction is contrary to an approach to achieve the quickness of the development with use of the functional blocks which have been registered in the library. Therefore, in the existing circumstances, only correction can be applied to such a degree that the wiring delay is reduced by, for example, inserting timing adjusting circuits (e.g., buffers) in the wiring to connect the functional blocks, or the like. For example, FIG. 4 shows an example of a configuration in which the above timing adjusting circuits are inserted between the functional blocks. The functional block 26 and the functional block 27 are connected to each other via lines 28-1, 28-2, 28-3, . . . , 28-j (where j is a natural number). Then, a timing adjusting circuit 29 and a timing adjusting circuit 30 are inserted in the line 28-2 and the line 28-j respectively. The functional block 26 and the functional block 27 have a function portion 33 and a function portion 34, in which a plurality of logic portions 31 and a plurality of flip-flops 32 are arranged respectively. The clock signal CLK is supplied to respective clock input terminals via a common clock base line 35.

SUMMARY OF THE INVENTION

The present invention has been made in light of the above circumstances and it is an object of the present invention to provide a functional block and a semiconductor integrated circuit whose delay time of output signals for input signals in the functional block can be estimated easily and precisely to thus reduce a design term and also a production cost of the semiconductor integrated circuit. More particularly, such object of the present invention is to provide a functional block and a semiconductor integrated circuit which are able to facilitate operational simulation of the semiconductor integrated circuit, which is composed of a plurality of functional blocks, by estimating easily and precisely delay times in respective functional blocks.

It is another object of the present invention to provide a functional block and a semiconductor integrated circuit by which the semiconductor integrated circuit to be operated firmly can be simply architected, by setting easily a timing. Where the term "functional block" means a semiconductor integrated circuit which has been optimally designed every function and registered in a library previously. For instance, the functional block includes processors such as CPU, MPU, etc., various peripherals of processors such as memory controller, interrupt controller, LAN controller, direct memory access controller, timer, serial I/O, parallel I/O, etc.

In order to achieve the above object, according to the present invention, there is provided a functional block comprising (a) a function portion; (b) a plurality of block input terminals; (c) a plurality of block output terminals; (d) a first signal holding circuit group connected between inputs of the function portion and the plurality of block input terminals; and (e) a second signal holding circuit group connected between outputs of the function portion and the plurality of block output terminals.

The functional portion has a plurality of random logic portions, and performs a predetermined process of the signal input into the input terminals of the functional block and then outputs the result. In some cases, the functional portion may be equipped with synchronizing circuits such as flip-flops, etc. The first signal holding circuit group is composed of a plurality of first signal holding circuits and the second signal holding circuit group is composed of a plurality of second signal holding circuits. The first signal holding circuits and the second signal holding circuits can hold the input signals once, and then output the held signals in synchronous with a predetermined control signal (e.g., a clock signal supplied from the outside of the functional block). For example, flip-flops may be employed. The first signal holding circuits are provided to correspond to the block input terminals respectively. The second signal holding circuits are provided to correspond to the block output terminals respectively.

According to features of the present invention, the signals input into the block input terminals are held once by the first signal holding circuit group and then output to the function portion in synchronous with the predetermined control signal. Also, the signals being output from the function portion are held once by the second signal holding circuit group and then output to the block output terminals in synchronous with the predetermined control signal. Therefore, the delay time of the output signals relative to the input signals in the functional block can be estimated without regard to input states and signal transmission routes. In other words, the definition of the delay time in the functional block can be facilitated. As a result, operational simulation of the semiconductor integrated circuit in which a plurality of functional blocks are incorporated in combination can be performed easily and in turn a design term of such semiconductor integrated circuit can be reduced.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DESCRIPTION OF THE PREFERRED EMBODIMENTS

Figure 1:
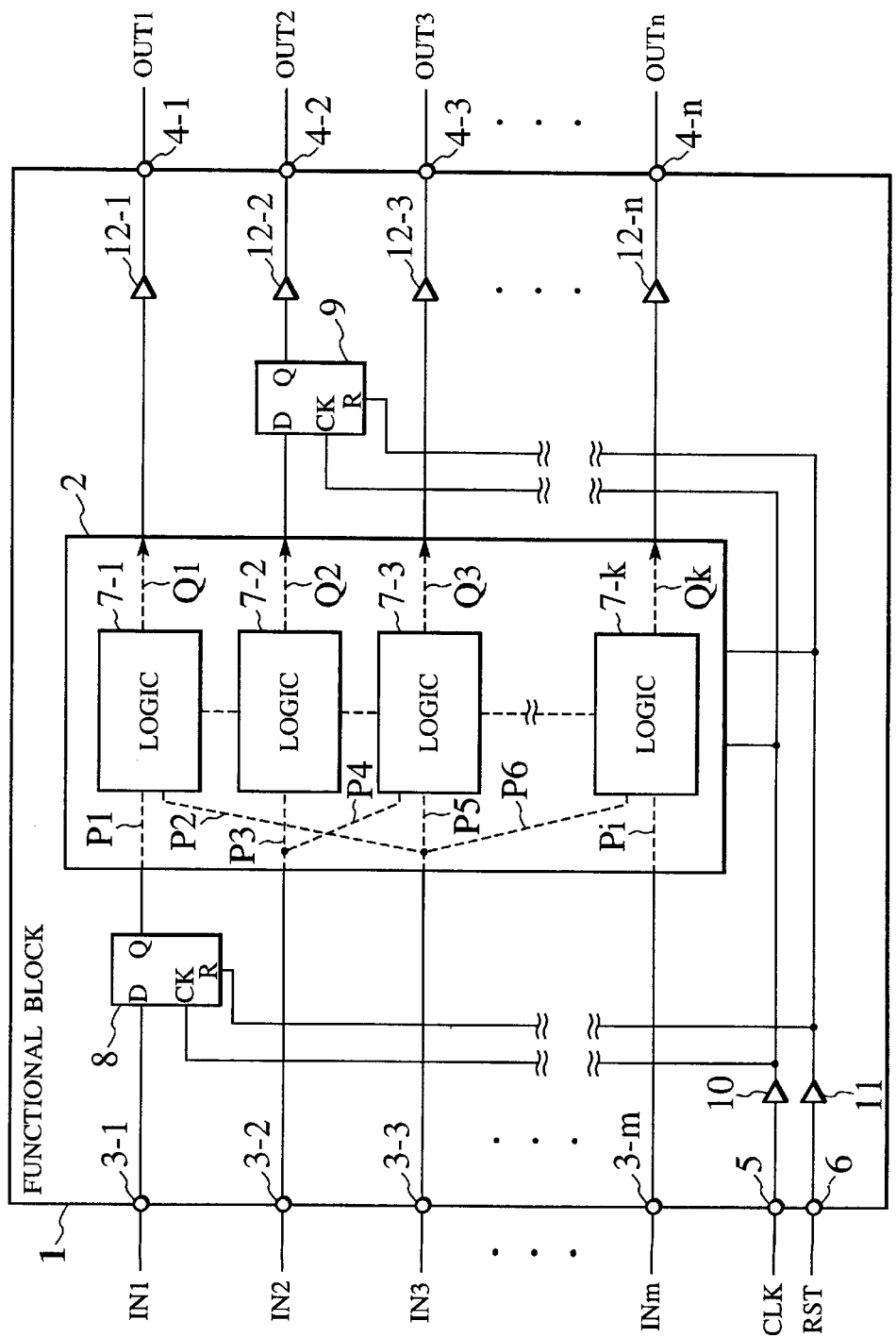
FIG. 1 is a block circuit diagram showing an example of a configuration of a functional block in the prior art.
Figure 2:
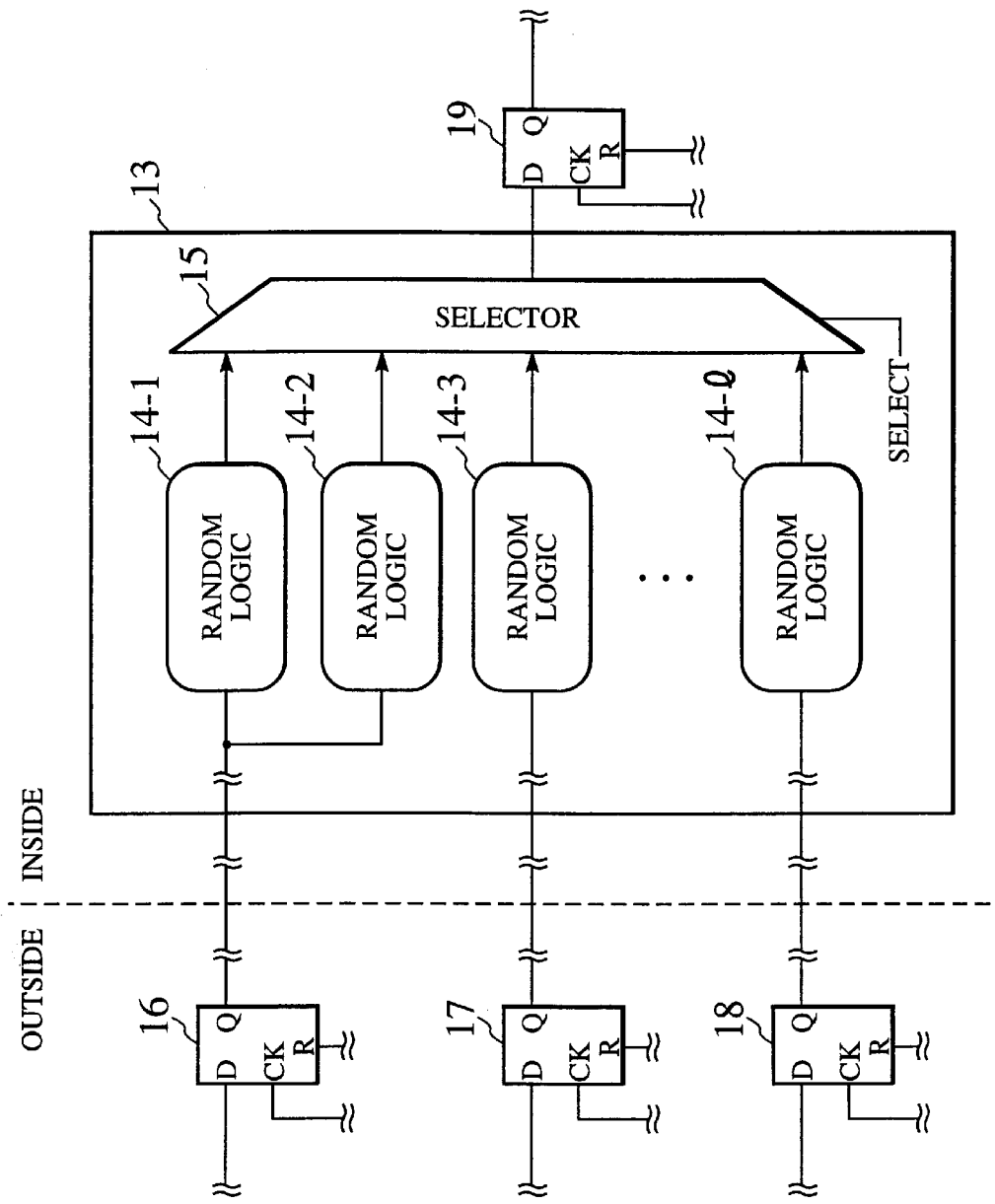
FIGS. 2 and 3 are block circuit diagrams each showing an example of a configuration of a logic portion shown in FIG. 1.
Figure 3:
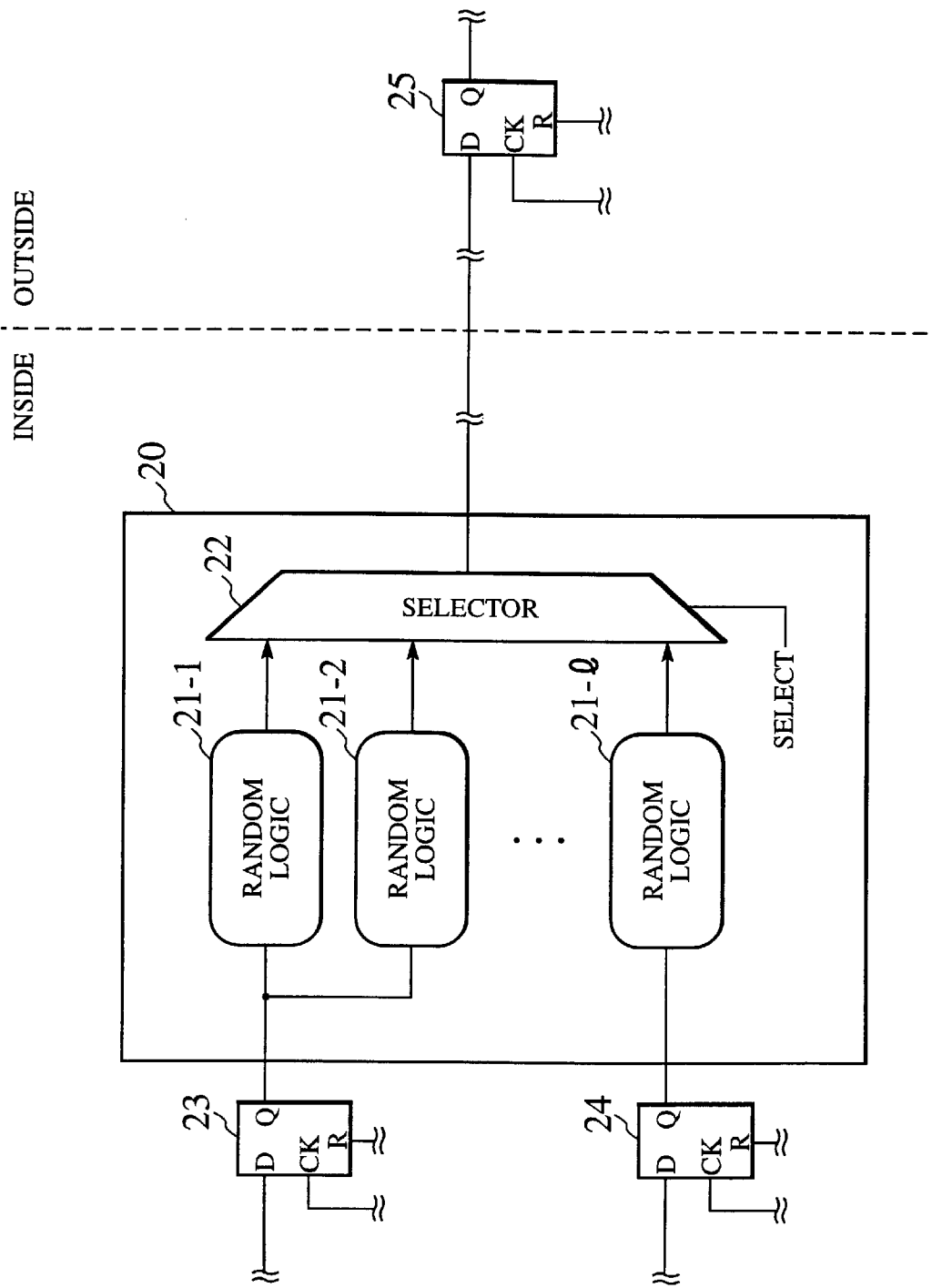

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(First Embodiment)

Figure 5:
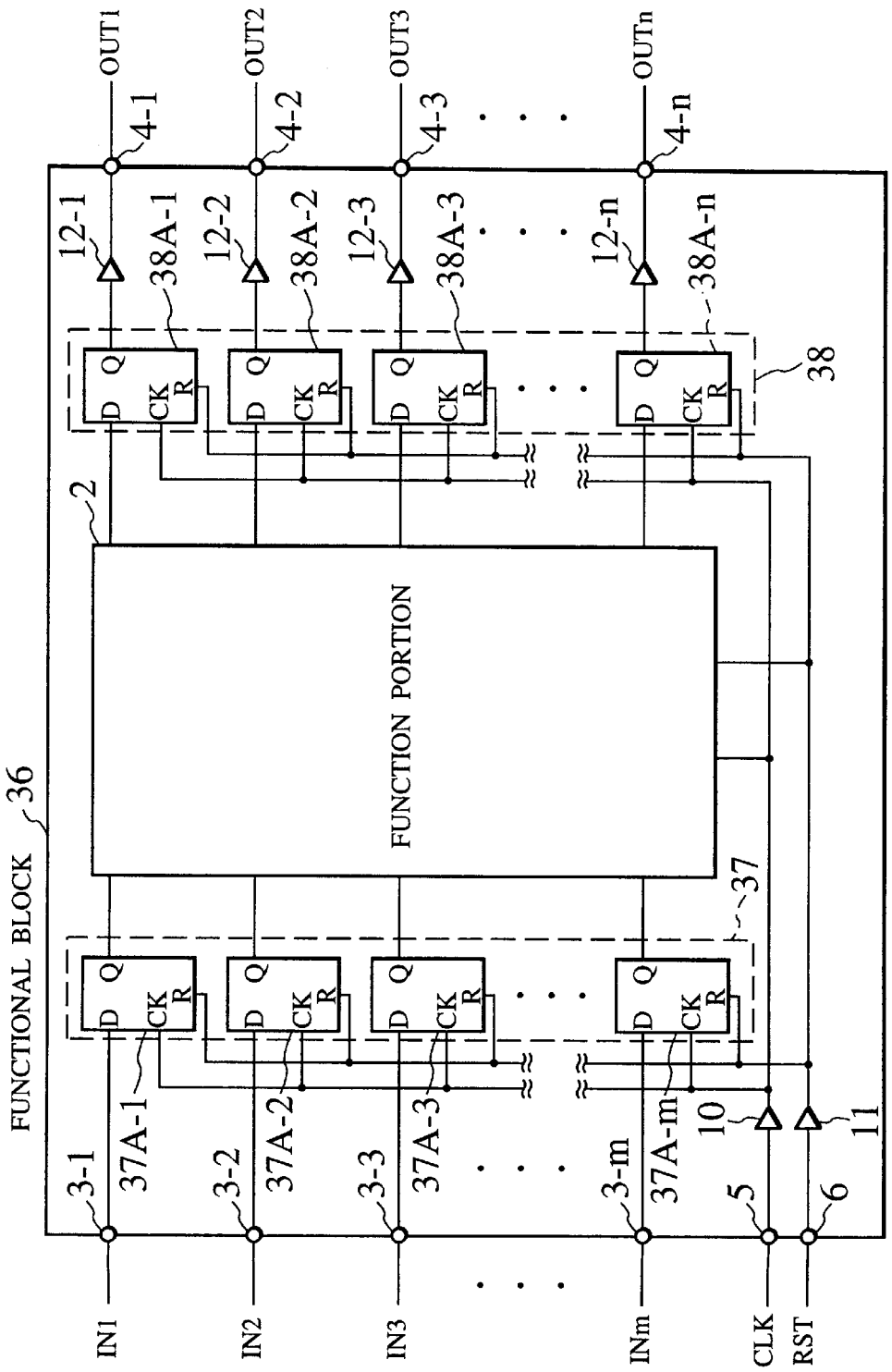
FIG. 5 is a block circuit diagram showing an example of a configuration of a functional block according to a first embodiment of the present invention.

FIG. 5 shows an example of a configuration of a functional block according to a first embodiment of the present invention. In FIG. 5, the same symbols are labeled to the same parts in FIG. 1 in the prior art. A functional block 36 comprises a function portion 2, a plurality of input terminals 3-1, 3-2, 3-3, . . . , 3-m (where m is a natural number) connected to the function portion 2, a plurality of output terminals 4-1, 4-2, 4-3, . . . , 4-n (where n is a natural number), a clock input terminal 5 for receiving a clock signal CLK, and a reset input terminal 6 for receiving a reset signal RST. The functional block 36 can perform predetermined operations of a plurality of input signals IN1, IN2, IN3, . . . , INm supplied from the input terminals 3-1, 3-2, 3-3, . . . , 3-m, and then output results of the operations from the output terminals 4-1, 4-2, 4-3, . . . , 4-n as output signals OUT1, OUT2, OUT3, . . . , OUTn. The clock signal CLK and the reset signal RST are supplied to the function portion 2. The clock signal CLK is a signal serving as a reference in carrying out a synchronous operation. The functional block 36 can perform the synchronous operation on a basis of the clock signal CLK. The functional block 36 can be reset by the reset signal RST irrespective of its present state. Although not illustrated, the function portion 2 has a plurality of logic portions, as in the prior art example shown in FIG. 1. Further, if the case may be, the function portion 2 may include a plurality of synchronizing circuits.

In addition, the functional block 36 includes a first flip-flop group 37 connected between the input terminals 3-1, 3-2, 3-3, . . . , 3-m and inputs of the function portion 2, and a second flip-flop group 38 connected between outputs of the function portion 2 and the output terminals 4-1, 4-2, 4-3, . . . , 4-n. The first flip-flop group 37 is composed of flip-flops 37A-1, 37A-2, 37A-3, . . . , 37A-m such that respective flip-flops 37A-1, 37A-2, 37A-3, . . . , 37A-m are provided to correspond to the input terminals 3-1, 3-2, 3-3, . . . , 3-m. Each of the flip-flops 37A-1, 37A-2, 37A-3, . . . , 37A-m has an input terminal D, an output terminal Q, a clock terminal CK, and a reset terminal R. The input terminals 3-1, 3-2, 3-3, . . . , 3-m are connected to the input terminals D of the flip-flops 37A-1, 37A-2, 37A-3, . . . , 37A-m respectively, while the output terminals Q of the flip-flops 37A-1, 37A-2, 37A-3, . . . , 37A-m are connected to the inputs of the function portion 2 respectively. In contrast, the second flip-flop group 38 is composed of flip-flops 38A-1, 38A-2, 38A-3, . . . , 38A-n such that respective flip-flops 38A-1, 38A-2, 38A-3, . . . ,38A-n are provided to correspond to the input terminals 3-1, 3-2, 3-3, . . . , 3-m. Each of the flip-flops 38A-1, 38A-2, 38A-3, . . . , 38A-n has an input terminal D, an output terminal Q, a clock terminal CK, and a reset terminal R. The outputs of the function portion 2 are connected to the input terminals D of the flip-flops 38A-1, 38A-2, 38A-3, ..., 38A-n respectively, while the output terminals Q of the flip-flops 38A-1, 38A-2, 38A-3, ..., 38A-n are connected to the output terminals 4-1, 4-2, 4-3, ..., 4-n via buffers 12-1, 12-2, ..., 12-n respectively. The clock signal CLK being input from a clock input terminal 5 is supplied to the clock terminals CK of the flip-flops 37A-1, 37A-2, 37A-3, ..., 37A-m and the flip-flops 38A-1, 38A-2, 38A-3, ..., 38A-n via a buffer 10. The reset signal RST is input into the reset terminals R of all flip-flops 37A-1, 37A-2, 37A-3, ..., 37A-m and all flip-flops 38A-1, 38A-2, 38A-3, ..., 38A-n via a buffer 11. All flip-flops, when receive the reset signal RST, can be brought into their reset states regardless of their present states.

The flip-flops 37A-1, 37A-2, 37A-3, ..., 37A-m constituting the first flip-flop group 37 receive the input signals IN1, IN2, IN3, ..., INm being input into the input terminals 3-1, 3-2, 3-3, ..., 3-m respectively, and then output such input signals to the function portion 2 in synchronous with the clock signal CLK respectively. The flip-flops 38A-1, 38A-2, 38A-3, ..., 38A-n constituting the second flip-flop group 38 receive outputs of the function portion 2 respectively, and then output such outputs to the output terminals 4-1, 4-2, 4-3, ..., 4-n in synchronous with the clock signal CLK respectively.

The functional block 36 as constructed as above can output all the input signals IN1, IN2, IN3, ..., INm, which are input into the input terminals 3-1, 3-2, 3-3, ..., 3-m, to the function portion 2 so as to synchronize with the clock signal CLK by using the first flip-flop group 37. Then, all the outputs of the function portion 2 can be output to the output terminals 4-1, 4-2, 4-3, ..., 4-n so as to synchronize with the clock signal CLK by using the second flip-flop group 38. As a result, an input-to-output delay in the functional block 36 can be defined easily in unit of a period of the clock signal CLK. In other words, there is no need to consider variation in a delay time due to state dependency and route dependency of the input signals IN1, IN2, IN3, ..., INm.

In the first embodiment, the case where the overall functional block 36 performs a synchronous operation based on the clock signal CLK has been explained. However, if the first flip-flop group 37 and the second flip-flop group 38 can be operated to synchronize with the same clock signal respectively, any case where the overall functional block 36 performs a synchronous operation based on more than two clock signals may be employed. In the first embodiment, the first flip-flop group 37, the second flip-flop group 38, and the function portion 2 have received directly the clock signal from the same clock line. However, a buffer for adjusting a driving force may be inserted appropriately in the middle of the clock line.

As described above, according to the first embodiment of the present invention, since the input-to-output delay in the functional block can be defined precisely, behavior confirmation can be facilitated by virtue of simulation prior to production and also a time required for such simulation can be reduced. That is to say, according to the first embodiment of the present invention, labor saving, quickness, and high precision in LSI design can be achieved and in turn reduction in an LSI development term can be achieved.

(Second Embodiment)

Figure 6:
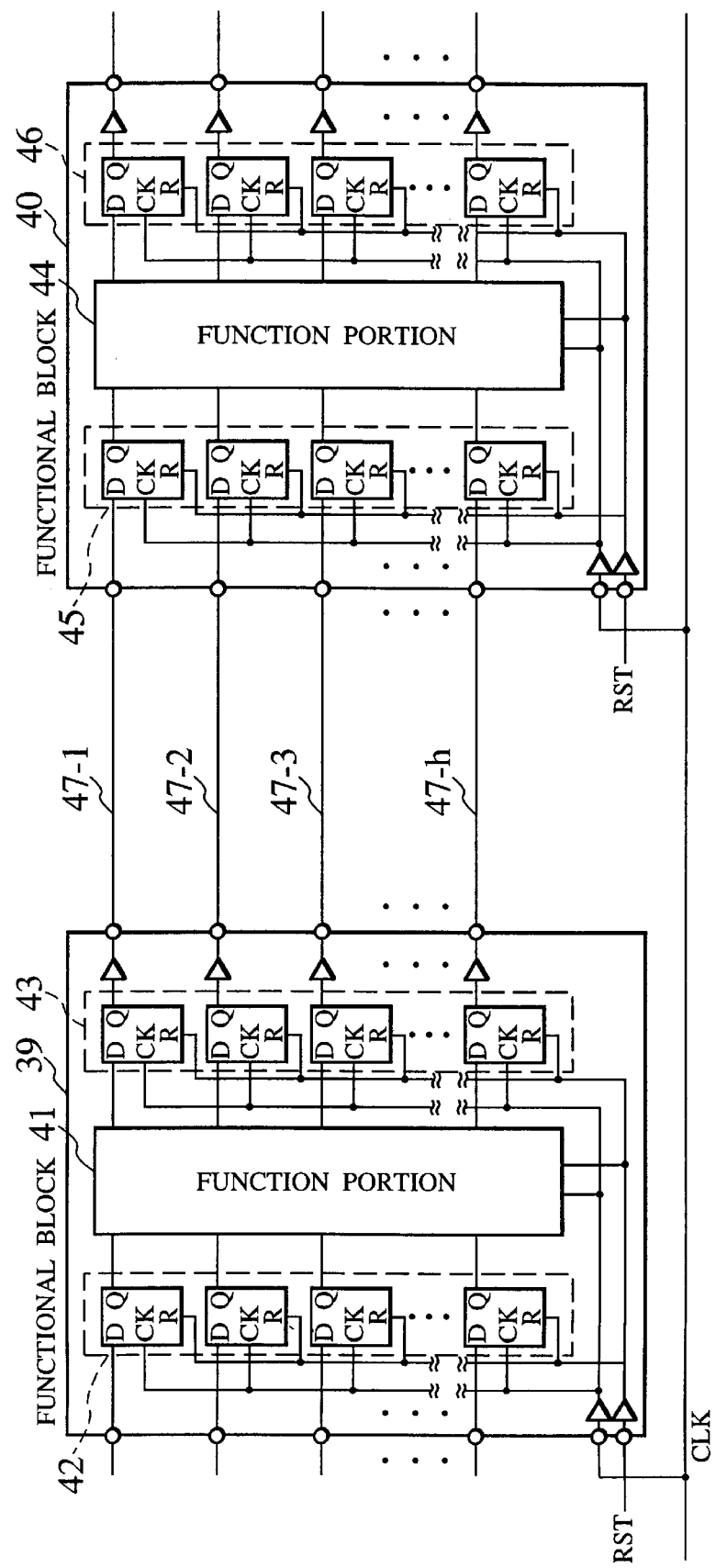
FIG. 6 is a partial block circuit diagram showing an example of a configuration of a semiconductor integrated circuit according to a second embodiment of the present invention.

Next, a second embodiment of the present invention will be explained. FIG. 6 is a fragmentary block circuit diagram showing an example of a configuration of a semiconductor integrated circuit according to the second embodiment of the present invention. This semiconductor integrated circuit is constructed by connecting a plurality of functional blocks obtained according to the first embodiment of the present invention. Like the functional block 36, shown in FIG. 5, a functional block 39 has a first flip-flop group 42 on the input side of a function portion 41 and a second flip-flop group 43 on the output side of the function portion 41. A functional block 40 has a first flip-flop group 45 on the input side of a function portion 44 and a second flip-flop group 46 on the output side of the function portion 44. The functional block 39 and the functional block 40 are connected via lines 47-1, 47-2, 47-3, ..., 47-h (where h is a natural number).

Figure 4:
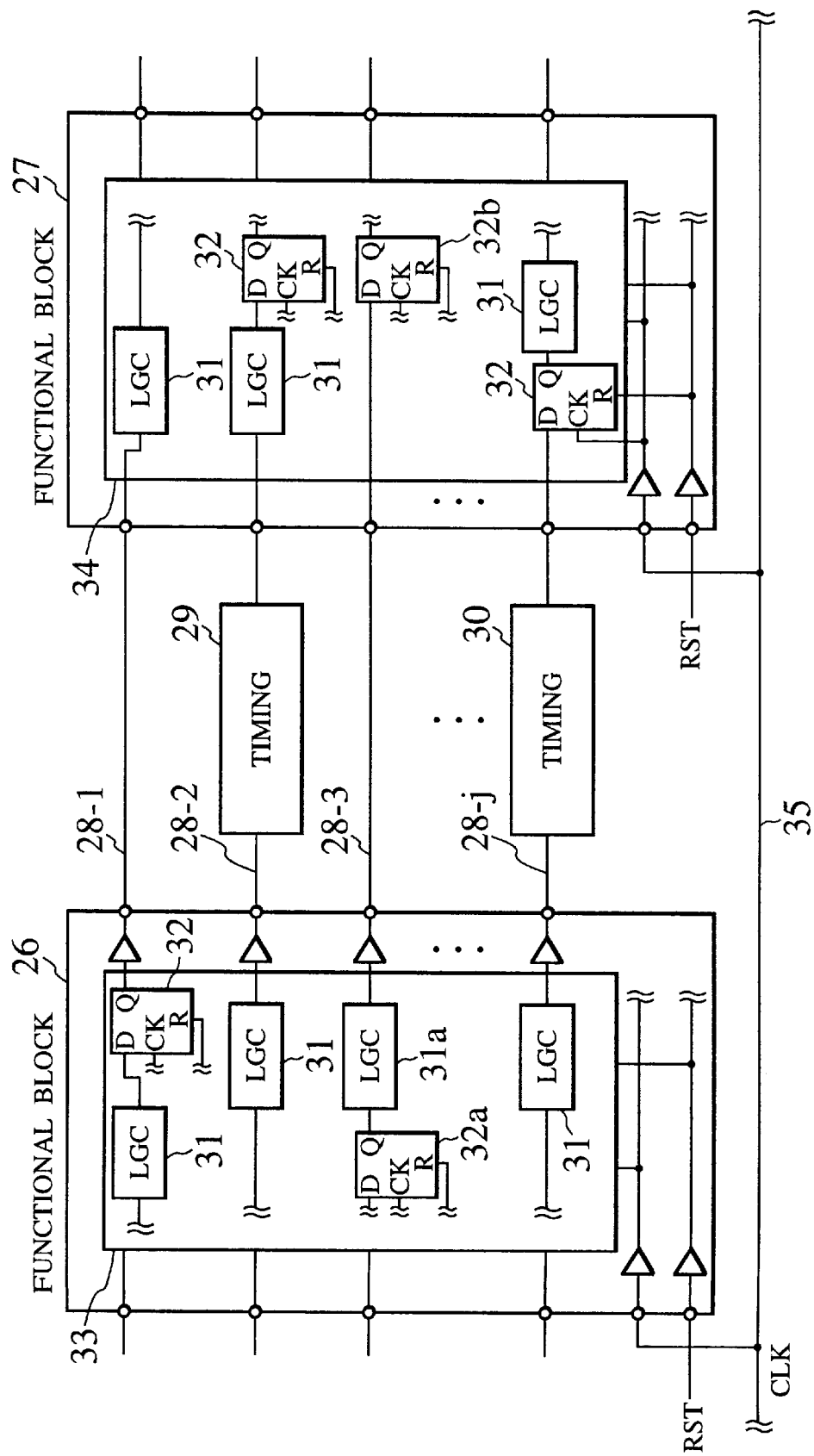
FIG. 4 is a block circuit diagram showing an example of a configuration in which timing adjusting circuits are inserted between functional blocks shown in FIG. 1.

Next, in contrast to an operation for transmitting signals between the functional block 26 and the functional block 27 shown in FIG. 4 in the prior art, an operation for transmitting signals between the functional block 39 and the functional block 40 shown in FIG. 6 will be explained. For example, a line 28-3 in FIG. 4 connects an output of the logic portion 31a in the functional block 26 to an input of the flip-flop 32b in the functional block 27. In other words, the asynchronous design circuit is provided in the functional block 26 side while the synchronous design circuit is provided in the functional block 27 side. Assume that the flip-flop 32a in FIG. 4 can output a first signal at a first rising edge of the clock signal CLK. Then, the logic portion 31a receives the first signal and then outputs the second signal to the line 28-3 after a predetermined time has lapsed. Then, the second signal is transferred to the flip-flop 32b via the line 28-3. Then, the second signal can be input into the flip-flop 32b at a second rising edge succeeding to the above first rising edge. In this case, in order to transfer the second signal precisely between the functional block 26 and the functional block 27 shown in FIG. 4, $$\text{Tlogic} + \text{Tline} + \text{Tsetup} < \text{a period of CLK} \tag{1}$$

must be satisfied.

Where Tlogic is a delay time of the output for the input of the functional block 26, Tline is a delay time due to resistance and capacitance of the line 28-3, and Tsetup is a time the flip-flop 32b holds the second signal prior to the second leading timing of the clock signal CLK. In order ensure that the flip-flop 32b can output the second signal without fail in synchronous with the clock signal CLK, the second signal must be held quicker by an amount of Tsetup than the second rising edge of the clock signal.

The above Eq. (1) means that, if a total sum of the delay times (Tlogic, Tline) and the timing constraint (Tsetup) imposed on the flip-flop 32b is smaller than a period of the clock signal CLK, the second signal can be transferred precisely between the functional block 26 and the functional block 27. However, since the delay time has input state dependency and route dependency described as above, in many cases Tlogic cannot be defined equally. Therefore, in the high speed semiconductor integrated circuit, the event that Eq. (1) cannot be satisfied due to minute variation in the delay time may occur. Depending upon the change in the delay time caused by application environments (change in the atmospheric temperature and the drive voltage) of the semiconductor integrated circuit and also the input state dependency and the route dependency of the delay caused in operation of the semiconductor integrated circuit, the case will be caused where the functional block can operate in a certain situation but it cannot operate in another situation.

On the contrary, in the second embodiment of the present invention, it is possible to remove Tlogic in Eq. (1), otherwise Tlogic can be regarded very small and to be less varied. More particularly, in FIG. 6, outputs of the second flip-flop group 43 in the functional block 39 are connected directly to output terminals of the functional block 39 via buffers respectively. Accordingly, the route dependency to bring about variation in the delay time can be eliminated. In addition, output signals from the second flip-flop group 43 can be output in synchronous with the clock signal CLK. Therefore, it is to be noted that verification to the effect whether or not the signal can be transferred precisely between the functional block 39 and the functional block 40 can be conducted by taking only the delay caused by the lines 47-1, 47-2, . . . , 47-n into account.

As described above, according to the second embodiment of the present invention, since the functional block arranged on the signal output side can output the signal in synchronous with the clock signal CLK, a timing setting in the functional block arranged on the signal input side can be facilitated. As a result, operational simulation of the semiconductor integrated circuit in which a plurality of functional blocks are installed can be conducted simply at high speed. Also, the semiconductor integrated circuit whose operation can be assured can be constructed at high speed.

(Third Embodiment)

Figure 7:
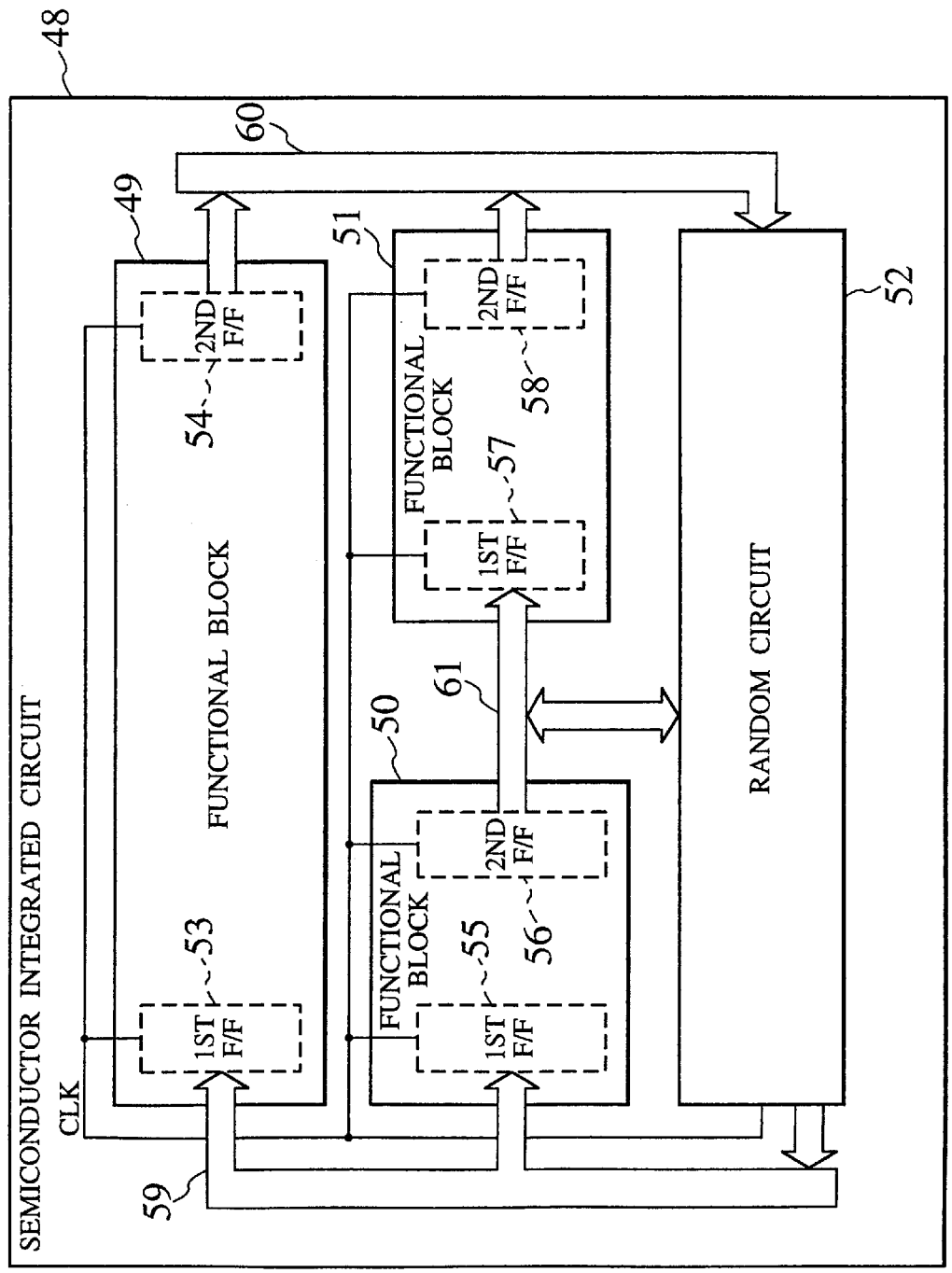
FIG. 7 is a block circuit diagram showing an example of a configuration of a semiconductor integrated circuit according to a third embodiment of the present invention.

FIG. 7 shows an example of a configuration of a semiconductor integrated circuit according to a third embodiment of the present invention. A semiconductor integrated circuit 48 comprises a functional block 49, a functional block 50, a functional block 51, and a random circuit 52. Like the functional block 36 in FIG. 5, the functional block 49 has a first flip-flop group 53 and a second flip-flop group 54. Also, the functional block 50 has a first flip-flop group 55 and a second flip-flop group 56. Further, the functional block 51 has a first flip-flop group 57 and a second flip-flop group 58. The output side of the random circuit 52 is connected to the first flip-flop group 53 of the functional block 49 and the first flip-flop group 55 of the functional block 50 via a bus 59. The input side of the random circuit 52 is connected to the second flip-flop group 54 of the functional block 49 and the second flip-flop group 58 of the functional block 51 via a bus 60. The second flip-flop group 56 of the functional block 50 and the first flip-flop group 57 of the functional block 51 are connected to each other via a bus 61 being connected to the random circuit 52. The first flip-flop groups 53, 55, 57 and the second flip-flop groups 54, 56, 58 of the functional blocks 49, 50, 51 can receive the same clock signal CLK and operate in synchronous with the clock signal CLK. They are constructed in a so-called completely synchronous manner.

According to the third embodiment of the present invention, since inputs/outputs of respective functional blocks are constructed in the completely synchronous manner, input-to-output delays in respective functional blocks can be represented by using a simply model. As a result, operational simulation of a large scale semiconductor integrated circuit in which a plurality of functional blocks are installed in combination can be conducted readily.

Various modifications will become possible for those skilled in the art after receiving the teachings of the present disclosure without departing from the scope thereof.

What is claimed is:

1. A functional block comprising:
    (a) a function portion including a plurality of logic portions connected to one another, each of the logic portions receives at least one of a plurality of input signals and generates an output signal;
    (b) a plurality of block input terminals;
    (c) a plurality of block output terminals;
    (d) a first signal holding circuit group connected between inputs of the function portion and the plurality of block input terminals; and
    (e) a second signal holding circuit group connected between outputs of the function portion and the plurality of block output terminals,
    wherein a plurality of first signal holding circuits constituting the first signal holding circuit group are provided to correspond to the plurality of block input terminals respectively such that they can output signals, which are output from the plurality of block input terminals, to the function portion in synchronous with a control signal, and
    a plurality of second signal holding circuits constituting the second signal holding circuit group are provided to correspond to the plurality of block output terminals respectively such that they can output signals, which are output from the function portion, to the plurality of block output terminals in synchronous with the control signal, and
    the function portion receives the control signal.

2. A functional block set forth in claim 1, wherein each of the plurality of first signal holding circuits has a first input terminal, a first output terminal, and a first control terminal.

3. A functional block set forth in claim 2, wherein each of the plurality of first signal holding circuits receives the control signal at the first control terminal.

4. A functional block set forth in claim 3, wherein each of the plurality of first signal holding circuits outputs its output signal from the first output terminal in synchronous with the control signal.

5. A functional block set forth in claim 1, wherein each of the plurality of second signal holding circuits has a second input terminal, a second output terminal, and a second control terminal.

6. A functional block set forth in claim 5, wherein each of the plurality of second signal holding circuits receives the control signal at the second control terminal.

7. A functional block set forth in claim 6, wherein each of the plurality of second signal holding circuits outputs its output signal from the second output terminal in synchronous with the control signal.

8. A functional block set forth in claim 1, wherein the control signal is a clock signal which is supplied to the functional block from an external device.

9. A semiconductor integrated circuit composed of a plurality of functional blocks,
    each of the blocks comprising
    (a) a function portion including a plurality of logic portions connected to one another, each of the logic portions receives at least one of a plurality of input signals and generates an output signal;
    (b) a plurality of block input terminals;
    (c) a plurality of block output terminals;
    (d) a first signal holding circuit group connected between inputs of the function portion and the plurality of block input terminals; and
    (e) a second signal holding circuit group connected between outputs of the function portion and the plurality of block output terminals,
    wherein a plurality of first signal holding circuits constituting the first signal holding circuit group are provided to correspond to the plurality of block input terminals respectively such that they can output signals, which are output from the plurality of block input terminals, to the function portion in synchronous with a control signal, and
    a plurality of second signal holding circuits constituting the second signal holding circuit group are provided to correspond to the plurality of block output terminals respectively such that they can output signals, which are output from the function portion, to the plurality of block output terminals in synchronous with the control signal, and the function portion receives the control signal.

10. A semiconductor integrated circuit set forth in claim 9, wherein each of the plurality of first signal holding circuits has a first input terminal, a first output terminal, and a first control terminal.

11. A semiconductor integrated circuit set forth in claim 10, wherein each of the plurality of first signal holding circuits receives the control signal at the first control terminal.

12. A semiconductor integrated circuit set forth in claim 11, wherein each of the plurality of first signal holding circuits outputs its output signal from the first output terminal in synchronous with the control signal.

13. A semiconductor integrated circuit set forth in claim 9, wherein each of the plurality of second signal holding circuits has a second input terminal, a second output terminal, and a second control terminal.

14. A semiconductor integrated circuit set forth in claim 13, wherein each of the plurality of second signal holding circuits receives the control signal at the second control terminal.

15. A semiconductor integrated circuit set forth in claim 14, wherein each of the plurality of second signal holding circuits outputs its output signal from the second output terminal in synchronous with the control signal.

16. A semiconductor integrated circuit set forth in claim 9, wherein the control signal is a clock signal which is supplied to the functional block from an external device.

* * * * *